United States Patent [19]

Lo Valvo et al.

[11] 4,027,086

[45] May 31, 1977

[54] PROCESS FOR PREPARING ELASTOMERIC COPOLYMERS OF VINYLIDENE FLUORIDE AND THE ELASTOMERIC COPOLYMERS OBTAINED THEREBY

[75] Inventors: Ernesto Lo Valvo, Peschiera Borromeo, (Milan); Gianfranco Diotallevi; Carlo Laganà, both of Milan, all of Italy

[73] Assignee: Montedison S.p.A., Milan, Italy

[22] Filed: Aug. 7, 1975

[21] Appl. No.: 602,800

[30] Foreign Application Priority Data

Aug. 9, 1974 Italy ................................. 26188/74

[52] U.S. Cl. .............................. 526/79; 260/31.2 R; 260/32.6 R; 260/328 R; 260/47 UP; 260/79.5 R; 260/79.5 D; 526/27; 526/49; 526/253; 526/254

[51] Int. Cl.$^2$ ........................................ C08F 214/22

[58] Field of Search ............... 260/92.1 R, 92.1 S, 260/80.77, 87.5 A, 884, 47 UP; 526/253, 79

[56] References Cited

UNITED STATES PATENTS 3,622,549  11/1971  Keller .......................... 260/80.77
3,845,024  10/1974  Weaver ........................ 260/80.77
3,876,654  4/1975   Pattison ....................... 260/80.77

Primary Examiner—Harry Wong, Jr.

[57] ABSTRACT

A process for preparing new elastomeric copolymers of vinylidene fluoride having exceptionally valuable properties is disclosed. Monomeric mixtures containing vinylidene fluoride in such quantities as to yield elastomeric products are polymerized in solution, emulsion or suspension, or in the absence of solvents and/or dispersants (mass or bulk) in the presence of radical polymerization initiators, at temperatures of −30° C to =200° C, preferably at 0° C to 120° C, and at a pressure of from autonomous pressure to 300 atmospheres. In this process, vinylidene fluoride is fed into the reaction mixture during the polymerization and in a quantity such that the ratio between the added vinylidene fluoride and the vinylidene fluoride of the monomeric mixture subjected to polymerization varies between 0.1 and 1.5.

The products referred to herein as "elastomeric copolymers of vinylidene fluoride" are copolymers, terpolymers or tetrapolymers of vinylidene fluoride with hexafluoroprene, and/or 1-, and/or 2-hydrofluoroprene, with or without tetrafluoroethylene.

8 Claims, No Drawings

PROCESS FOR PREPARING ELASTOMERIC COPOLYMERS OF VINYLIDENE FLUORIDE AND THE ELASTOMERIC COPOLYMERS OBTAINED THEREBY

THE PRIOR ART

Elastomeric copolymers of vinylidene fluoride have been known for a long time and as having chemical, physical and technical characteristics which render them suitable for use in various fields.

Such copolymers of the prior art have been obtained by feeding into the reactor a well-defined mixture of monomers of constant composition so as to maintain the same pressure and the same ratio between the monomers in the reactor over the entire polymerization time.

The copolymers thus obtained have various disadvantages, depending on their type. More particularly,
the workability characteristics and/or the
behavior at low temperatures and/or the
thermal stability
of the known copolymers are less than completely satisfactory.

Moreover, some of the known copolymers of vinylidene fluoride cannot be vulcanized with cross-linking agents of the polynucleophilic aromatic type, such as, e.g., 2,2-Bis (4-hydroxyphenyl) propane and 2,2-Bis(4-hydroxyphenyl) hexafluoropropane, which are marketed as Bisphenol A and Bisphenol AF, respectively, and which, if useable with siad vinylidene fluoride copolymers would result in vulcanizates having physical-mechanical and thermal properties considerably superior to those of the vulcanized products obtained using vulcanizing agents of the polyamino type (aliphatic polyamine carbamates; condensates of aromatic aldehydes and aliphatic diamines, etc.).

THE PRESENT INVENTION

An object of this invention is to provide a process for preparing elastomeric vinylidene fluoride copolymers which are free of the aforementioned disadvantages and drawbacks.

This and other objects which will be apparent hereinafter are achieved by the process of this invention in accordance with which monomeric mixtures containing vinylidene fluoride in the amounts to result in elastomeric copolymers are polymerized in solution, emulsion or suspension, or in the absence of solvents and/or dispersants (mass or bulk) in the presence of radical polymerization initiators, at −30° C to +200° C, preferably at 0° C to 120° C, at a pressure between the autogeneous pressure and 300 atmospheres and, during the polymerization, vinylidene fluoride is fed into the polymerization reactor in an amount such that the ratio between the added vinylidene fluoride and the amount thereof in the starting monomeric mixture varies from 0.1 to 1.5.

In the particular case of elastomeric terpolymers of vinylidene fluoride/1-hydropenetafluoropropene/tetrafluoroethylene containing from 68% to 80% in moles of chemically combined vinylidene fluoride, prepared by the present process, the copolymers exhibit general properties which are surprisingly superior to those of terpolymers of the same monomers and having the same composition but prepared by the prior art processes.

More particularly, the terpolymers of this invention exhibit, surprisingly,
better workability in the roller mixers, without any rendings of the sides, and an absence of stickiness on the rollers;
excellent moldability, with absence of stickiness in the molds;
increased thermal stability;
better compression-set values; and, finally,
improved behavior at low temperatures.

In addition, and importantly, and unlike analogous terpolymers of the prior art, the present terpolymers can be vulcanized successfully with cross-linking agents of the polynucleophilic aromatic type, such as, for instance, Bisphenol AF.

The improved properties of the vinylidene fluoride copolymers of this invention must be particularly related to the increased vinylidene fluoride content thereof resulting from the feed-in of the vinylidene fluoride during the polymerization reaction and in amounts to maintain the ratio stated between the added vinylidene fluoride and the vinylidene fluoride of the monomeric mixture subjected to polymerization.

This aspect of the present invention is particularly surprising, since when it has been attempted to improve the properties of the copolymers by enriching the starting monomeric mixtures with vinylidene fluoride, the results have been altogether unsatisfactory inasmuch as the products thus obtained did not have satisfactory elastomeric characteristics.

The special, and unexpected, properties of these copolymers must be attributed to the presence therein of polymeric sequences the vinylidene fluoride content of which is definitely higher than the mean content of that monomer chemically bound in the end product. In fact, NMR analysis of the present terpolymers has given evidence of the presence therein of polymeric sequences essentially consisting of polymerized vinylidene fluoride having a frequency greater than that found in terpolymers of the prior art and having the same mean end content of polymerized vinylidene fluoride.

The improved properties exhibited by the vinylidene (fluoride/hydropentafluoropropene/tetrafluoroethylene terpolymers prepared by the present method are also exhibited, to a more or less pronounced degree, by other vinylidene fluoride copolymers, terpolymers and tetrapolymers prepared by this method. This is especially true of the following:

vinylidene fluoride/1-hydropentafluoroprene binary copolymers;
vinylidene fluoride/hexafluoropropene binary copolymers;
vinylidene fluoride/hexafluoropropene/tetrafluoroethylene terpolymers;
vinylidene fluoride/1-hydropentafluoropropene/2-hydroxypentafluoropropene/tetrafluoroethylene tetrapolymers;
vinylidene fluoride/hexafluoropropene/1-hydroxypentafluoropropene/tetrafluoroethylene tetrapolymers;

and other similar polymeric materials containing chemically combined vinylidene fluoride.

The process of the invention can be used to prepare elastomeric copolymers of vinylidene fluoride with one or more of the following monomers: 1-hydropentafluoropropene, 2-hydroxypentafluoropropene, and hexafluoropropene. Similarly, the process can be used to prepare elastomeric terpolymers and tetrapolymers of vinylidene fluoride with tetrafluoroethylene containing as third and/or fourth component 1-hydropentafluoropropene and/or 2-hydropentafluoropropene and/or hexafluoropropene.

The process is particularly suitable for the preparation of elastomeric terpolymers and tetrapolymers of vinylidene fluoride with tetrafluoroethylene and 1-hydropentafluoropropene.

As mentioned previously, in accordance with this invention, the monomer mixture containing vinylidene fluoride is polymerized in the presence of radical initiators. The type of radical initiator used varies and depends on the polymerization conditions, including the temperature. The initiators used are the organic and inorganic peroxides of a type which is well-known to the skilled in the art.

The amount of the initiator used is from 0.001 to 5.0, preferably from 0.01 to 3.0, parts by weight per 100 parts by weight of the monomeric mixture to be polymerized.

The polymerization according to the invention can be carried out in solution, in emulsion, in dispersion, or in the absence of any solvent and/or dispersant, i.e., in mass or bulk.

In solution polymerization, it is preferred to use, as solvents, halogenated or perhalogenated organic compounds which are liquid under the polymerization conditions. The fluorinated and chlorofluorinated derivatives of aliphatic and cycloaliphatic hydrocarbons are particulary useful for use as solvents. Alternatively, the liquid polymerization medium may be one or more of the monomers to be polymerized in the liquid state.

In the presently preferred embodiment of the invention, the monomeric mixture containing vinylidene fluoride is polymerized in aqueous phase comprising the polymerization initiators and, possibly, in addition, activators for the initiators; buffer agents for maintaining the pH of the aqueous phase constant during the polymerization; emulsifying agents, preferably those based on alkaline or ammonium salts of fatty acids or long-chained perfluoro-alkanoic salts such as perfluorooctanoic acid or chloro-derivatives thereof.

The polymerization can be conducted in a continuous operation or batchwise, at pressures varying from 1 to 200 atm. preferably from 2 to 100 atm., and at temperatures of from −30° C to +200° C, preferably from 0° C to 120° C.

In the presently preferred embodiment, the monomer mixture in the gaseous state is fed into the reactor containing water, the initiators, and other additives of the kind indicated.

The composition of the monomeric mixture fed to the reactor is selected in such a way that, taking account of the percent increase in vinylidene fluoride following the additions thereof during the polymerization the resulting binary copolymer, terpolymer or tetrapolymer will have the desired composition and elastomeric properties.

The addition of vinylidene fluoride during the polymerization, which is a characterizing feature of the process of this invention, can be accomplished in various ways.

According to a particularly convenient operating procedure, feeding of the monomeric mixture into the reactor is interrupted until the pressure of the gaseous phase reaches a value between 1/100 and 9/10, preferably between 3/100 and 8/10 of the pressure as it would be under normal operating condition, i.e., with constant feeding of the monomers mixture and no immission of vinylidene fluoride. At that point, the reactor is fed exclusively with vinylidene fluoride until the pressure attains a value comprised between 11/10 and 19/10 but preferably comprised between 12/10 and 16/10 of the pressure of the normal operation. Thereupon, the mixture in the reactor is left to polymerize until the usual polymerization pressure is attained, whereupon feeding of the starting monomeric mixture is resumed.

The number of vinylidene fluoride immissions, which may be periodical or non-periodical, may vary within wide limits, depending on the composition of the starting monomeric mixture, on the pressure and temperature conditions, and on the characteristics desired for the end elastomer.

The polymeric materials according to the invention, having a qualitative-quantitative composition within the ranges previously stated herein, have the appearance of non-vulcanized rubbers, are usually amorphous and characterized by a low torsional modulus, and are generally soluble in some solvents, for instance ketones such as acetone, butanone, cyclohexanone; esters such as formates, acetates, propionates, methyl, ethyl and propyl butyrrates, etc.; formamides, dimethylformamide, etc.

In the IR absorption spectra of these new elastomeric vinylidene fluoride polymers different absorption bands can be found which reveal the presence of polymerized units of the different monomers in the macromoecules. The intensity of the absorption bands depends directly on the quantity of single structural units present in the macromolecules.

For instance, in the IR spectra of vinylidene fluoride/1-hydropentafluoropropene/tetrafluoroethylene terpolymers of the invention the characteristic absorption bands which reveal the presence of polymerized vinylidene fluoride units in the terpolymer are in the zone of 6.95 microns, 7.1 microns, and 11.40 microns; those showing the presence of polymerized units of tetrafluoroethylene are in the zone of 10.0 micron, 10.75 micron, and 12.15 micron. Finally, in the zone 7.50 micron and 7.80 micron, are present, on the contrary, the absorption bands attributable to the polymerized 1-hydropentafluoropropene units.

The polymeric materials according to the invention may be easily processed with the standard machines used for rubbers. They may be subjected to further treatments to produce manufactured articles of excellent mechanical properties and endowed with excellent thermal and chemical resistance.

These treatments comprise vulcanization processes which cause the formation of cross-links amongst the different molecules of the polymeric material thereby considerably increasing the mechanical resistance characteristics and the elasticity module of the material.

As vulcanizing agents, besides the well known polyfunctional organic bases such as for instance hexamethylenediamine or hexamethylenediamine carbamate, N,N'-bis-dicynamyliden-hexamethylenediamine, diethylentriamine, cycloalkyl diamines, etc. aromatic polynucleophile compounds such as benzene and/or naphtalene derivatives containing at least two OH and/or SH groups prove to be particularly suited.

All these vulcanizing agents may be used in combination with accelerators of the known type such as cyclic or linear polyethers, ammonium or phosphonium quaternary compounds, quaternary N-alkoxyammonium compounds, quaternary P-alkoxy-phosphonium compounds, complexes of triphenyl-phosphine with metal halides, phosphoranes, etc.

Various other adjuvants which function, for instance, as acid acceptors reinforcing agents, fillers, pigments, plasticizers, etc., may also be mixed with the polymer before the vulcanization, operating according to methods well known to the processors of elastomeric products.

A suitable process for the vulcanization of the polymeric materials according to this invention consists, for instance, in blending 100 parts of elastomer with 3–20 parts of magnesium oxide, 0–60 parts of carbon black, 0.5–4 parts of a vulcanizing agent and 0.1–2 parts of accelerator, by means of a conventional roller mixer.

The blend thus formulated is then pressure molded at 140° – 200° C in a mold for a period of, for instance, from 1 minute to 1 hour (vulcanization).

The molded object thus formed is kept at 180° – 250° C for a period of 10 – 24 hours so as to complete the vulcanization (postvulcanization).

The thus vulcanized polymeric materials display excellent mechanical properties over a wide range of temperatures, particularly at low temperatures. Their thermal and dimensional stability is so high that the vulcanizates can be exposed to temperatures even higher than 250° C for hundreds of hours without any appreciable variation in their properties. Moreover, they are characterized by extremely low values of permanent deformation under compression (compression-set). They also possess a high resistance to aggressive chemical reactants such as, for instance, mineral acids or bases, and a high insolubility in various organic solvents and liquids such as for instance aliphatic and aromatic hydrocarbons, fuel and lubricating oils, chlorinated derivatives of methane, ethylene, ethane, etc.

The polymeric materials according to this invention are particularly useful in the manufacture of films, plates, tapes and objects of various shape and size. They may also be deposited by the usual methods as a protective layer on the surfaces of different materials, in particular on metal surfaces towards which they show good adhesion values even at high temperatures (250° C), or by impregnation starting both from aqueous emulsions or latexes as well as from solutions in suitable solvents such as aliphatic ketones, for instance, acetone, butanone, cyclohexanone, esters such as formates, acetates, propionates and butyrates of lower alcohols.

In particular the vulcanized elastomers according to this invention are especially useful for the production of flexible tubes, flange gaskets, packings for sealing organs, joints, containers, etc., when resistance is required to ageing and to the attack by solvents or by aggressive chemical agents at high temperatures.

The following examples are given for better illustrating, without however in any way limiting, the essential features of the present invention.

EXAMPLE 1

A vacuum of 1 mm Hg was established in a 5 liters autoclave, internally lined with stainless steel and fitted with an anchor stirrer, a heating jacket, a thermometer and a pressure gauge and with suitable discharging and leading devices for the reactants and the products. Nitrogen was introduced up to atmospheric pressure, a vacuum of 1 mm Hg was again produced. This cycle of washings with nitrogen under vacuum was repeated several times and then by suction, 3.2 lt. of accurately deaerated water, were introduced into the reactor.

The autoclave was then heated up to 90° C and, still by suction, 0.3 lt. of deaerated water containing 9 grams of $(NH_4)_2S_2O_8$ were introduced subsequently, by means of a compressor, a gaseous mixture was fed in containing:

|  | Moles % |
| --- | --- |
| tetrafluoroethylene | 18 |
| hydropentafluoropropene | 19 |
| vinylidene fluoride | 63 | until the pressure in the autoclave was 12 atmospheres (normal polymerization pressure).

As the polymerization proceeded, the terpolymer was formed and, in order to keep the pressure inside the autoclave (12 atm.) constant, a gaseous mixture of the above specified composition was continuously fed in by means of the compressor.

After 80 liters (measured at room temperature and pressure) of the monomeric mixture, were fed into the autoclave, feeding thereof was interrupted and the remaining mixture was then left to polymerize until a pressure of 8 atm. (reduced pressure) was attained. At this point, pure vinylidene fluoride was fed into the autoclave until a pressure of 16 atm. (supernormal pressure) was reached, whereupon the mixture thus obtained was left to polymerize up to a pressure of 12 atm. (normal reaction pressure) and the feeding of the starting monomeric mixture was resumed.

After a further consumption of 80 lt. of monomeric mixture, feeding thereof was interrupted and the remaining monomeric mixture in the autoclave was left to polymerize until the pressure was 8 atm. At this point, pure vinylidene fluoride was again fed in until the pressure reached 16 atm., after which the procedure described above was followed.

Immission of vinylidene fluoride, after the consumption of 80 liters of monomeric mixture was repeated twice, operating as indicated above. A total of 4 immissions of vinylidene fluoride were made during the course of the polymerization cycle. The ratio between vinylidene fluoride fed in during the polymerization and that deriving from the fed mixture was about 0.55.

After about 70 minutes, with a total consumption of 400 lt. of monomeric mixture (excluding the vinylidene fluoride periodically introduced during the reaction), the feeding of the monomeric mixture was interrupted and the aqueous dispersion of the terpolymer thus obtained was discharged from the autoclave.

The terpolymer was precipitated from the dispersion by treating the dispersion with an aqueous HCl solution. The terpolymer thus obtained was then washed for a long time with running water until the pH was neutral, then dried in a forced air oven at 65° C. Finally, it was homogenized on a roller mill.

In this way there were obtained 1600 g of a white terpolymer with the aspect and characteristics of non-vulcanized rubber. The composition, in percent, determined by IR analysis was:

| | Moles % |
|---|---|
| vinylidene fluoride | 72 |
| 1-hydropentafluoropropene | 14.6 |
| tetrafluoroethylene | 13.4 |

In the IR absorption spectrum of the terpolymer characteristic bands were found in the zones of: 6.95; 7.15; 7.80; 10.00; 10.75; 11.40 and 12.15 microns. The presence of units derived from vinylidene fluoride, tetrafluoroethylene and 1-hydropentafluoropropene was also confirmed by MNR analysis. The intrinsic viscosity of the terpolymer, measured in methylethylketone at 30° C, was 1.06 (100 ml/g) and the MOONEY ML (1 + 4) viscosity, determined at 100° C according to ASTM D 1646 – 63 standards, was 90 points.

In order to show the differences between the terpolymers according to this invention and those prepared according to the prior art having a mean end content of the three components identical or substantially equal, the data obtained by MNR analyses of the terpolymers characterized were compared and are reported below:

| Starting Mixture | INVENTION | COMP. A | COMP. B |
|---|---|---|---|
| tetrafluoroethylene | 18% moles | 13.6% moles | 17.5% moles |
| 1-hydropentafluoropropene | 19% moles | 14.9% moles | 18.6% moles |
| vinylidene fluoride | 63% moles | 71.5% moles | 63.9% moles |
| vinylidene fluoride immissions | yes | no | no |
| Mean end composition in moles percent: | INVENTION | COMP. A | COMP. B |
| tetrafluoroethylene | 13.4 | 13.3 | 17.8 |
| 1-hydropentafluoropropene | 14.6 | 14.8 | 18.2 |
| vinylidene fluoride | 72 | 71.9 | 64 |

The intrinsic viscosities in methylethylketone at 30° C were:
for the terpolymer of the invention: 1.06; for COMP. A: 0.99; for COMP. B: 1.06. The MOONEY ML viscosities were: for the terpolymer of the invention: 90; for COMP. A: 93 and for COMP. B: 85. Except for the immission of vinylidene fluoride during the polymerization, all other operating conditions for the preparation of the three terpolymers were the same. Indicating with capital letters the three components of the terpolymers, and more precisely:

vinylidene fluoride: with A;
1-hydropentafluoropropene: with B;
tetrafluoroethylene: with C.

and with $P_{AA}$ $P_{AB}$ $P_{AC}$ $P_{BB}$ $P_{BC}$ $P_{CC}$ the various possible binary combinations, the probability was calculated of each of the possible binary couplings between the three monomeric units present in the terpolymers, on the basis of a random statistical distribution model, using the data of the mean end composition of the terpolymers, calculated on the basis of a MNR analysis. These theoretical values were compared with the experimental values relating to the couplings themselves and more particularly relating to $P_{AA}$, $P_{AB}$ and $P_{AC}$, directly deduced from the MNR spectra. The experimental and theoretical values for the three terpolymers considered are recorded in the following table.

| | INVENTION | | COMPARISON A | | COMPARISON B | |
|---|---|---|---|---|---|---|
| Value | Theoretical | Experimental MNR | Theoretical | Experimental MNR | Theoretical | Experimental MNR |
| $P_{AA}$ | 0.51 | 0.56 | 0.51 | 0.50 | 0.43 | 0.42 |
| $P_{AB}$ | 0.22 | 0.19 | 0.22 | 0.22 | 0.25 | 0.26 |
| $P_{AC}$ | 0.19 | 0.17 | 0.19 | 0.19 | 0.21 | 0.21 |
| $P_{BB}$ | 0.02 | — | 0.02 | — | 0.04 | — |
| $P_{CC}$ | 0.02 | — | 0.02 | — | 0.02 | — |
| $P_{BC}$ | 0.04 | — | 0.04 | — | 0.05 | — |

REMARK:
For the couplings $P_{BB}$, $P_{CC}$ and $P_{BC}$ which are either chemically inadmissable or experimentally non-controllable because of the smallness of the integrated intensitives of the relative signals in the MNR spectrum, only the theoretical values are reported in order to prove the little importance such groupings have in the whole of the terpolymer.

It is apparent, from examining the tabulated data, that, while for the two comparative terpolymers the theoretical and experimental values corresponding to the A—A couplings are practically co-incident, in the terpolymer of this invention the experimental value $P_{AA}$ is considerably higher than the theoretical value, thereby showing a greater frequency of A—A sequences (vinylidene fluoride) in comparison to the theoretically calculated frequency, which coincides practically with the theoretical and experimental values of the comparative terpolymer A (having substantially the same mean end composition). The values relating to the comparative terpolymer B have been recorded in order to prove that also in the case of terpolymers prepared according to the prior art and having a lower mean end content in vinylidene fluoride, the theoretical and experimental MNR values relative to coupling $P_{AA}$ substantially coincide.

In order to evaluate the physical-mechanical and thermal characteristics of the vulcanized products prepared from vulcanizable compositions based on the terpolymer according to the invention and from the comparative terpolymers A and B, three blends of the following composition (parts by weight) were prepared:

| | INVENTION | A | B |
|---|---|---|---|
| Invention terpolymer | 100 | — | — |
| Comparative terpolymer A | — | 100 | — |
| Comparative terpolymer B | — | — | 100 |
| Maglite MgO type D | 3 | — | — |
| Maglite MgO type Y | — | 15 | 15 |
| Carbon black type MT | 30 | 20 | 20 |
| Ca(OH)$_2$ | 8 | — | — |
| Accelerator (1) | 0.85 | — | — |
| Accelerator (2) | 0.15 | — | — |
| Bis-phenol AF monopotassium salt | 1.6 | — | — |
| Vulcanizer (3) | — | 1.6 | 1.5 |

-continued

|  | INVENTION | A | B |
|---|---|---|---|
| Vulcanizer (4) | — | 0.3 | 0.4 |

(1) CuCl . 2P (C₆H₅)₃
(2) N-methoxy-N-methylpiperidinium iodide
(3) and (4)-aminic vulcanizing aids of the type marketed by Montedison S.p.A. under the trademarks "Tecnocin CS" and "Tecnocin D".

The comparative polymers A and B, when formulated according to the same recipe used for the polymer according to the invention, as described above, result in blistered commercially unacceptable manufactured products.

The terpolymer of the invention, and the comparative terpolymers A and B in suitable amounts, were separately molded into sheets 2 mm thick in a compression mold at a temperature of 170° C and for about 7 minutes, under a pressure of 50 kg/sq. cm.

The sheets extracted from the molds were placed in a forced air oven at 250° C for 20 hours, with a gradual temperature rise to the 250° C temperature over a period of 8 hours.

The rheological characteristics of the mixes and of the vulcanized products thus obtained, are summarized in Table I.

TABLE I

| TYPE OF BLENDS | INVENTION | COMP. A | COMP. B |
|---|---|---|---|
| Rheological Characteristics | | | |
| Mooney Scorch (MS) (1) | | | |
| at 21° C, minimum | 51 | 40 | 44 |
| minutes for an increase of | | | |
| 10 points | 35 | 39 | 43 |
| CHARACTERISTICS OF VULCANIZED PRODUCTS | | | |
| Tensile tests (2) (rate 500 mm/min.) | | | |
| Tensile strength kg/sq. cm. | 200 | 160 | 180 |
| Modulus at 100% elongation | | | |
| kg/sq. cm. | 77 | 90 | 60 |
| Elongation at break, in % | 180 | 165 | 190 |
| IRHD Hardness (3) | 71 | 74 | 69 |
| Compression set (4) | | | |
| O-Rings (25.4 × 53 mm.) at | | | |
| 200° C for 72 hours; % | 29 | 61 | 50 |
| Disc ASTM-1 200° C × 72 hours, % | 16 | 36 | 30 |
| Cold properties (5) | | | |
| Modulus G-700 kg/sq. cm. at ° C | −14 | −9 | −8 |
| Thermal stability | | | |
| 275° C × 70 hours | | | |
| Variation of tensile strength | | | |
| in % | −25 | −65 | −44 |
| Variation of modulus 100% | | | |
| elong., % | −10 | +40 | +21 |
| Variation of elongation at | | | |
| break % | 0 | −60 | −25 |
| TYPE OF MIX | INVENTION | COMP. A | COMP. B |
| Variation of IRHD hardness points | 0 | +11 | +7 |

(1) According to ASTM-D 1646-63, with small-sized rotor.
(2) According to ASTM-D 412-62T, on 2 mm thick test pieces, with type C hollow punch.
(3) According to ASTM-D 1415-68, on 6 mm thick test pieces, reading after 30 seconds.
(4) According to ASTM- 395-61, method B.
(5) According to ASTM-D 1043; it corresponds to the temperature at which the G modulus of apparently rigidity is 700 kg/sq. cm.

From the whole of the data reported in Table I it is evident that the vulcanized products obtained from terpolymers according to the invention are characterized by a complex of physical-mechanical and thermal properties which are remarkably superior to those of vulcanized products of analogous terpolymers prepared according to the prior art.

More particularly, the thermal resistance characteristics, the permanent set to compression (compression-set) and the resistance to cold are considerably improved; these features in the last analysis mean improved performance of said vulcanized products and extend considerably the areas in which the products are useful.

In order to further evidence the superiority of the terpolymer according to the invention in comparison with the analogous terpolymers prepared according to the prior art, three other vulcanizable compositions were prepared having the following composition (parts by weight):

| TYPE OF BLENDS | 1 | 2 | 3 |
|---|---|---|---|
| Terpolymer according to | | | |
| the invention | 100 | — | — |
| Comparative terpolymer B | — | 100 | 100 |
| Magnesium oxide | 5 | 5 | 5 |
| Carbon black MT | 25 | 25 | 25 |
| Ca (OH)₂ | 8 | 8 | — |
| Monopotassic bisphenol AF salt | 1.85 | 1.85 | — |
| Cu Cl . 2P (C₆H₅)₃ | 1 | 1 | — |
| "Tecnocin A" | — | — | 3.45 |

The vulcanization was carried out at 175° C for 12 minutes under pressure, and the post-vulcanization was carried out in a forced air oven at 250° C for 20 hours with a gradual temperature rise in 8 hours.

The rheological characteristics of the molecules and the physical-mechanical and thermal characteristics of the vulcanized products thus obtained are summarized in Table II.

TABLE II

| TYPE OF BLEND | 1 | 2 | 3 |
|---|---|---|---|
| RHEOLOGICAL CHARACTERISTICS: | | | |
| ODR 180° C (a) | | | |
| Torque (inch. lbs., minimum value) | 23 | 19 | 21 |
| after 2.5 minutes | 27 | 19 | 22 |
| after 5 minutes | 53 | 21 | 25 |
| after 7.5 minutes | 69 | 21 | 38 |
| after 10 minutes | 98 | 22 | 47 |
| after 15 minutes | 99 | 27 | 58 |
| after 20 minutes | 102 | 31 | 71 |
| after 30 minutes | 102 | 43 | 82 |

TABLE II-continued

| TYPE OF BLEND | 1 | 2 | 3 |
|---|---|---|---|
| MOONEY SCORCH MS (1) | | | |
| at 121° C; minimum value (points) | 38 | 33 | 29 |
| Minutes for 10 point increase | 35 | (oo) | 41 |
| CHARACTERISTICS OF VULCANIZED PRODUCTS: | | | |
| Tensile tests (2) (speed 500 mm/min.): | | | |
| Tensile strength          kg/sq. cm. | 165 | (ooo) | 153 |
| Modulus at 100% elongation  kg/sq. cm. | 71 | (ooo) | 49 |
| Elongation at break, in % | 180 | (—) | 305 |
| IRHD Hardness (3) | 71 | (—) | 72 |
| Compression Set (4) | | | |
| O-Rings (25.4 × 3.53 mm) at: | | | |
| 200° C × 70 hours, % | 22 | (—) | 46 |
| 200° C × 168 hours, % | 37 | (—) | 81 |
| Cold Properties (5) | | | |
| Modulus G - 700 kg/sq. cm. at ° C | −14 | (—) | −9 |
| Thermal stability: | | | |
| 275° C for 70 hours | | | |
| Variation of tensile strength, % | −18 | (—) | −28 |
| Variation of modulus at 100%, elong., % | −9 | (—) | +35 |
| Variation of elongation at break, % | +6 | (—) | −47 |
| Variation of IRHD Hardness points | 0 | (—) | +9 |

(o) According to ASTM-D 2705-681, using an oscillating disc rheometer (biconical disc).
(oo) 3 points after 45 minutes.
(ooo)Test pieces completely blistered.
(—) Not determinable.
(—) (5) See footnote to Table I.

From the data reported in Table II, it will be seen that Blend 1 (terpolymer according to the invention with vulcanizing agents of the polynucleophilic aromatic type) gives vulcanized products of excellent general characteristics (in particular the cold properties and thermal and compression-set stability); moreover its vulcanization rate is greater than that of Blends 2 and 3.

The data relating to Blend 2 (terpolymer prepared according to prior art) clearly confirm that such a polymer is not vulcanizable with the aromatic polynucleophilic compounds (mono-K-bis-phenol AF). Finally, the comparison between the data relating to Blend 1 and those relating to Blend 3 (terpolymer prepared according to the prior art with a vulcanizing agent of the aminic type) show beyond doubt the superiority of the vulcanized products from the terpolymer according to the invention Blend 1 (over the vulcanized products from copolymers according to the prior art Blend 3).

These improved characeristics are related to the particular structure of the terpolymer according to the invention which, contrary to the prior art terpolymers, are vulcanizable with aromatic polynucleophilic compounds which impart to the vulcanized products general characteristics that are definitely superior to those obtainable with polyaminic vulcanizing agents.

EXAMPLE 2

Example 1 was repeated using a feeding mixture having the following composition:

| | % in Moles |
|---|---|
| tetrafluoroethylene | 17.6 |
| 1-hydropentafluoropropene | 18.7 |
| vinylidene fluoride | 63.7 |

The normal polymerization pressure (12 atmospheres) was reduced to 8 atm. before each of the 5 immissions of vinylidene fluoride carried out periodically (every 70 liters of starting mixture consumed). Due to the immission of vinylidene fluoride, the pressure rose each time up to 16 atm. (super-normal pressure).

At the end of the polymerization (about 70 minutes with a consumption of about 400 liters of feeding mixture), the ratio between the vinylidene fluoride fed in during the polymerization and the vinylidene fluoride deriving from the starting feeding mixture was about 0.67.

The terpolymer obtained had the following mean end content of the three components;

| | % in Moles |
|---|---|
| tetrafluoroethylene | 12.5 |
| 1-hydropentafluoropropene | 13 |
| vinylidene fluoride | 74.5 |

The terpolymer had an intrinsic viscosity (in methylethylketone at 30° C) of 1.09 (100 ml/g) and a MOONEY viscosity at 100° C (1 + 4) of 98 points.

The general characteristics were altogether similar to those of the terpolymer of Example 1.

EXAMPLE 3

In this sample, the polymerization was carried out as described in Example 1, using, however, a 50 lt. autoclave into which 25 liters of water and 62.5 g of $(NH_4)_2S_2O_8$ were introduced. The gaseous feeding mixture had the following composition:

| | % in Moles |
|---|---|
| tetrafluoroethylene | 17.7 |
| 1-hydropentafluoropropene | 19.1 |
| vinylidene fluoride | 63.2 |

The normal polymerization pressure amounted to 12 atm., the reduced pressure before each of the 4 periodical vinylidene fluoride immissions (one every 580 liters of feeding mixture consumed) amounted to 8 atm. which rose to 18 atm. after each immission (super-normal pressure). At the end of the polymerization (about 60 minutes with a consumption of 2.900 liters of feeding mixtures) the ratio between the vinylidene fluoride fed in during the polymerization and that derived from the fed-in monomeric mixture was about 0.77.

The mean end composition of the terpolymer thus obtained was the following:

| | % in Moles |
|---|---|
| tetrafluoroethylene | 11.7 |
| 1-hydropentafluoropropene | 12.8 |
| vinylidene fluoride | 75.5 |

The intrinsic viscosity (in methylethylketone at 30° C) was 1.29 (100 ml/g); the MOONEY (1 + 4) viscosity was 99 points.

The general characteristics were altogether similar to those of the terpolymer of Example 1.

Three blends were prepared comprising the terpolymer and consisting of (parts by weight):

| Components: | (Number of Blend) | | |
|---|---|---|---|
| | 44 | 5 | 6 |
| Terpolymer according to the invention | 100 | 100 | 100 |
| MgO maglite type D | 3 | 3 | 3 |
| Carbon black MT | 35 | 35 | 35 |
| Ca (OH)$_2$ | 7 | 7 | 7 |
| -bis-phenol AF (vulcanizing agent) | 1.9 | — | — |

-continued

| Components: | (Number of Blend) 4 | 5 | 6 |
|---|---|---|---|
| -monopotassic salt of 2,4,4'-trihydroxybenzophenone (vulcanizing agent) | — | 1.65 | — |
| -monopotassic salt of bisphenol AF (vulcanizing agent) | — | — | 1.5 |
| -Co Cl$_2$ . 2P (C$_6$H$_5$)$_3$ (accelerator) | 1.35 | 1.2 | — |
| -[NiBr$_2$ . 2P (C$_6$H$_5$)$_3$] . (C$_4$H$_9$Br) (accelerator) | — | — | 0.9 |

The blends were compression molded at 180° C for 8 minutes and the sheets thus obtained were post-vulcanized in an oven at 250° C for 20 hours.

The rheological characteristics of the blends as well as the physical-mechanical and technical characteristics of the vulcanized products thus obtained, are summarized in Table III.

TABLE III

| Type of Blend | 4 | 5 | 6 |
|---|---|---|---|
| RHEOLOGICAL CHARACTERISTICS (1) | | | |
| MOONEY SCORCH MS at 121° C, minimum points | 41 | 40 | 43 |
| Minutes for an increase of 10 points | 28 | 32 | 19 |
| Tensile tests (2) (speed 500 mm/min.): | | | |
| Tensile strength         kg/sq. cm. | 150 | 165 | 145 |
| Modulus at 100% elongation, kg/sq. cm. | 71 | 65 | 88 |
| Elongation at break % | 190 | 205 | 185 |
| IRHD Hardness (3) | 79 | 81 | 83 |
| Compression-set (4) | | | |
| O-rings (25.4 mm × 3,53 mm) at | | | |
| 200° C × 70 hours | 23 | 31 | 21 |
| 200° C × 168 hours | 36 | 50 | 34 |
| Cold Properties (5) | | | |
| G-modulus - 700 kg/sq. cm. at ° C | −16 | −16 | −16 |
| Thermal stability | | | |
| at 275° C for 70 hours | | | |
| Variation in tensile strength, % | −19 | −28 | −21 |
| Variation in modulus at 100%, elong., % | −7 | +4 | −6 |
| Variation in elongation at break, % | +10 | −12 | +3 |
| Variation in IRHD Hardness points | 0 | +2 | +1 |

(1) – (5) See footnote to Table 1

As is clearly evidenced by the data in Table III, the terpolymer according to this invention can be transformed very conveniently into vulcanized products of good general characteristics, by using various combinations of different types of vulcanizing agents and accelerators.

EXAMPLE 4

In this case, the polymerization was carried out as described in Example 1, using, however, a 50 liters autoclave into which 35 lt. of water and 88 grams of (NH$_4$)$_2$S$_2$O$_8$ were introduced. The gaseous feedings mixture had the following composition:

| | % in Moles |
|---|---|
| tetrafluoroethylene | 17.6 |
| 1-hydropentafluoropropene | 19.1 |
| vinylidene fluoride | 63.2 |

The normal polymerization pressure was 12 atm., while the polymerization pressure reduced before each of the two periodical admixtures of vinylidene fluoride (every 1000 liters of consumed fed in mixture) amounted to 8 atmospheres, which rose to 16 atm. after each immission of vinylidene fluoride (super-normal pressure).

At the end of the polymerization (about 45 minutes with a consumption of about 2900 lt. of feeding mixture), the ratio between the vinylidene fluoride fed in during the polymerization and the vinylidene fluoride deriving from the feeding monomeric mixture, amounted to about 0.29. The mean end composition of the terpolymer thus obtained was as follows:

| | % in Moles |
|---|---|
| tetrafluoroethylene | 14.8 |
| 1-hydropentafluoropropene | 16.2 |
| vinylidene fluoride | 69 |

The intrinsic viscosity (in methylethylketone at 30° C) was 0.87 (100 ml/g) while the MOONEY ML (1 + 4) viscosity at 100° C was 69 points. The general characteristics were substantially similar to those of the terpolymers of the preceding examples.

For comparative purposes, operating as indicated above, a terpolymer was prepared using a gaseous feeding monomer mixture consisting of:

| | % in Moles |
|---|---|
| tetrafluoroethylene | 14.8 |
| 1-hydropentafluoropropene | 16.2 |
| vinylidene fluoride | 69 |

The polymerization was carried out without any immission of vinylidene fluoride, under the above indicated conditions, that is:

| pressure | = | 12 atm. (constant) |
|---|---|---|
| time | = | 55 minutes | consumption of feeding monomeric mixture = 2900 liters.

A terpolymer was obtained with the following average end composition:

| | % in Moles |
|---|---|
| tetrafluoroethylene | 14.5 |
| 1-hydropentafluoropropene | 15.5 |
| vinylidene fluoride | 70 |

It had an intrinsic viscosity (in methylethylketone at 30° C) of 0.96 (100 ml/g) and a MOONEY (1 + 4) viscosity of 89. This terpolymer, however, differently from the analogous terpolymer according to the invention, showed unsatisfactory characteristics, and in particular was difficult to process by means of the standard machines; it did not give a continuous sheet on a cylinder or roller mixer, and was not vulcanizable under standard conditions with aromatic polynucleophilic compounds such as bisphenol A, bisphenol AF, etc.

EXAMPLE 5

In this instance, Example 1 was repeated using a 5 lt. autoclave containing 3.5 lt. of water and 8.8 g of (NH$_4$)$_2$S$_2$O$_8$, and a gaseous feeding monomeric mixture consisting of:

| | % in Moles |
|---|---|
| tetrafluoroethylene | 17.3 |
| 1-hydropentafluoropropene | 18.8 |

-continued

|  | % in Moles |
| --- | --- |
| vinylidene fluoride | 63.9 |

The normal polymerization pressure was 12 atm. which dropped to 11 atm. (reduced pressure) before each of the 9 immissions of vinylidene fluoride (every 40 liters of consumed feed mixture) and brought up to 15 atm. (super-normal pressure) after each immission of vinylidene fluoride.

At the end of the polymerization (about 70 minutes, with a consumption of about 400 liters of feeding mixture) the ratio between the vinylidene fluoride periodically fed in and that deriving from the feeding mixture, amounted to about 0.35. The terpolymer thus obtained showed the following average end composition:

|  | % in Moles |
| --- | --- |
| tetrafluoroethylene | 12.9 |
| 1-hydropentafluoropropene | 13.5 |
| vinylidene fluoride | 73.6 | an intrinsic viscosity (in metylethylketone at 30° C) equal to 1.04 (100 ml/g) and a MOONEY ML (1 + 4) viscosity at 121° C equal to 140 points. The general characteristics of this terpolymer proved to be similar to those of the terpolymers according to this invention.

EXAMPLE 6

Example 1 was repeated, using a 5 lt. autoclave containing 3.5 lt. of water and 10.5 g. of $(NH_4)_2S_2O_8$, and a gaseous feeding mixture consisting of:

|  | % in Moles |
| --- | --- |
| tetrafluoroethylene | 18.5 |
| hexafluoropropene | 19.4 |
| vinylidene fluoride | 62.1 |

The normal polymerization pressure was equal to 12 atm. which was brought down to 8 atm. (reduced pressure) before each of the 4 periodical immissions of vinylidene fluoride (every 70 liters of feeding mixture consumed) and brought up to 16 atm. (super-normal pressure) after each immission of vinylidene fluoride. At the end of the polymerization (about 55 minutes), with a consumption of 350 liters of feeding mixture, the ratio between the vinylidene fluoride periodically fed in and the vinylidene fluoride deriving from the feeding mixture, amounted to about 0.41. The terpolymer thus obtained showed the following mean end composition:

|  | % in Moles |
| --- | --- |
| tetrafluoroethylene | 13 |
| hexafluoropropene | 17 |
| vinylidene fluoride | 70 | an intrinsic viscosity (in methylethylketone at 30° C) of 1.33 (100 ml/g) and a MOONEY ML (1 + 4) viscosity at 100° C of 125 points. This terpolymer was used to prepare two blends of the following composition (parts by weight):

| COMPONENTS | Number of Blend | |
| --- | --- | --- |
|  | 7 | 8 |
| Terpolymer according to the invention | 100 | 100 |
| - MgO maglite type D | 3 | 3 |
| - Carbon black MT | 30 | 30 |
| - Ca (OH)$_2$ | 6 | 6 |
| - bis-phenol AF | 1.75 | — |
| - monopotassic salt of 4,4'-dihydroxybenzophenone | — | 1.5 |
| - CoCl$_2$ . 2P (C$_6$H$_5$)$_3$ | 0.8 | — |
| - N-methoxy-N-methyl-piperidinium iodide | 0.3 | — |
| - [bis-triphenylphosphine (maleic anhydride) palladium](1) | — | 1.2 |

The blends thus obtained were compression molded and kept in a press at 180° C for 4 minutes, after which they were kept in an oven at 250° C for 20 hours.

The characteristics of the vulcanized products thus obtained are summarized in Table IV.

1. Palladium complex of the formula:

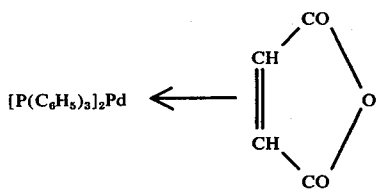

TABLE IV

| Type of Blend | 7 | 8 |
| --- | --- | --- |
| RHEOLOGICAL CHARACTERISTICS | | |
| ODR at 170° C $^{(a)}$ | | |
| Torque inch. lbs. (minimum value | | |
| after 2.5 minutes) | 31 | 23 |
| after 5 minutes) | 65 | 41 |
| after 7.5 minutes) | 99 | 63 |
| after 10 minutes) | 104 | 78 |
| after 15 minutes) | 106 | 89 |
| after 20 minutes) | — | — |
| after 30 minutes) | 111 | 94 |
| MOONEY SCORCH MS (1) | | |
| at 121° C, minimum points | 53 | 67 |
| minutes for increase of 10 points | 15 | 36 |
| CHARACTERISTICS OF VULCANIZED PRODUCTS: | | |
| Tensile tests (2) (speed 500 mm/min.): | | |
| Tensile strength     kg/sq. cm. | 180 | 178 |
| Modulus at 100% elongation,     kg/sq. cm. | 60 | 71 |
| Elongation at break, % | 215 | 195 |
| IRHD (3) Hardness | 73 | 73 |
| Compression-set (4) | | |
| 200° C × 70 hours, % | 26 | 34 |
| 200° C × 168 hours, % | 39 | 47 |
| (O-RINGS ($\phi$ 25.4 × 3.53 mm) | | |
| Properties cold (5) | | |
| Modulus G = 700 kg/sq. cm. at ° C | −15 | −16 |
| Thermal stability | | |
| (275° C × 70 hours) | | |
| Variation of: tensile strength in % | −21 | −30 |
| Variation of: modulus at 100% elong., % | −34 | −13 |
| Variation of: elongation at break, % | +40 | +3 |
| Variation of: IRHD Hardness points | −1 | 0 |

$^{(a)}$ (1) – (5) see footnotes to Tables I and II.

As clearly appears from the data reported in Table IV, the terpolymer of vinylidene fluoride/hexafluoropropene/tetrafluoroethylene, prepared as indicated above, can conveniently be transformed into vulcanized products of good overall characteristics by using aromatic polynucleophil vulcanizing agents in combination with accelerators of various types.

We claim:

1. A process for preparing elastomeric vinylidene fluoride/tetrafluorethylene/1-hydropentafluoroethylene terpolymers containing between about 68% and about 80% in moles of vinylidene fluoride, by polymerizing the three comonomers in solution, emulsion or suspension, or in the absence of solvents and or dispersants (mass or bulk), in the presence of radical initiators, at a temperature of from −30° C to +200° C and under a pressure from the autogenous pressure to 300 atms., said process being characterized in that the feeding of the monomeric mixture to the zone in which the terpolymerization is effected is interrupted intermittently, the monomeric mixture is left to polymerize in said zone until the pressure reaches a value comprised between 1/100 and 9/10 of the pre-fixed, normal polymerization pressure, vinylidene flouride is then fed into said zone until a pressure value comprised between 11/10 and 19/10 of the pre-fixed normal pressure is reached, the monomers mixture thus obtained is left to polymerize in said zone until the normal pressure is reached, and thereafter feeding of the monomers mixture is resumed, the ratio between the vinylidene fluoride fed to the reaction zone alone, as separate monomer, to the vinylidene fluoride fed in the mixture with tetrafluoroethylene and 1-hydropentafluoroethylene being comprised between 0.1 and 1.5.

2. The process of claim 1, in which the polymerization is carried out at a temperature of from 0° C to 120° C.

3. The process of claim 1, in which the immissions of vinylidene fluoride have periodical frequency.

4. The process of claim 3, in which the number of vinylidene fluoride immissions varies from 2 to 9.

5. The process of claim 1 in which, after feeding of the monomeric mixture is interrupted, the remaining monomeric mixture is left to polymerize until the pressure reaches a value comprised between 3/100 and 8/10 of the normal polymerization pressure, after which vinylidene fluoride in the gaseous state is fed into the reactor until the pressure reaches a value comprised between 12/10 and 16/10 of the normal gaseous pressure.

6. Elastomeric terpolymers of tetrafluoroethylene/1-hydro-pentafluoropropene/vinylidene fluoride, containing from about 68% to about 80% in moles of chemically combined vinylidene fluoride, prepared by the process of claim 1 and characterized by a high frequency of polymeric sequences, essentially consisting of polymerized vinylidene fluoride, the ratio between the frequency of the polymerized vinylidene fluoride sequences determined experimentally by NMR analysis and the theoretical value of the same frequency calculated on the basis of the mean composition of the terpolymer, being greater than 1.

7. Vulcanizable compositions based on the elastomeric terpolymers of vinylidene fluoride of claim 6 and containing, as vulcanizing agents, aromatic polynucleophil compounds.

8. Vulcanized products prepared from the vulcanizable compositions of claim 7.

* * * * *